United States Patent [19]

Sweet

[11] Patent Number: 4,787,139

[45] Date of Patent: Nov. 29, 1988

[54] BATTERY CABLE PULLER PLIERS

[76] Inventor: Paul A. Sweet, Rte. 1, Box 150, New Madrid, Mo. 63869

[21] Appl. No.: 1,366

[22] Filed: Jan. 8, 1987

[51] Int. Cl.[4] .............. B23P 19/04

[52] U.S. Cl. .............. 29/758; 29/246; 29/268; 29/764; 81/420

[58] Field of Search .............. 29/246, 268, 764, 762, 29/758, 730; 81/418, 420, 424.5, 300

[56] References Cited

U.S. PATENT DOCUMENTS

D. 139,485 11/1944 Jarvis .............. 29/246
2,363,350 11/1944 Nail .............. 29/246
2,478,881 8/1949 Wayrynen .............. 29/268
4,571,808 2/1986 King .............. 29/268

FOREIGN PATENT DOCUMENTS 58032 9/1953 France .............. 29/246

OTHER PUBLICATIONS

Yannotti, V. M., Installation Tool, Western Electric Technical Digest, No. 67, Jul. 1982, p. 27.

*Primary Examiner*—P. W. Echols
*Attorney, Agent, or Firm*—Allegretti & Witcoff, Ltd.

[57] ABSTRACT

An improved battery cable pliers includes a jaw configuration having a knife edge and spaced parallel legs which fit totally beneath a connector and cooperate with a second jaw associated with the pliers.

6 Claims, 2 Drawing Sheets

BATTERY CABLE PULLER PLIERS

BACKGROUND OF THE INVENTION

This invention relates to a battery cable puller pliers. Heretofore various patents have described pliers designed for the removal of a connector from the post of a battery. For example, the following patents disclose such a prior art pliers construction:

| Pat. No. | Inventor | Title | Issue Date |
|---|---|---|---|
| 1,346,306 | Duket | Pliers | 7/13/20 |
| 1,536,241 | Sroka | Storage Battery Lug Remover | 5/5/25 |
| 1,678,313 | Atkinson | Battery Tool | 7/24/28 |
| 1,792,400 | Schultz | Battery Pliers | 2/10/31 |

The referenced prior art patents generally teach a pliers having a pair of handles connected at a center pivot. Opposed jaws extend from the handles and are configured to cooperate respectively with a battery cable connector and a battery post associated with the connector.

While the prior art pliers structures have an appearance of great utility, the specific construction of such pliers may render them difficult to use in certain situations. For example, Sroka discloses a handle construction wherein the handles are generally arranged parallel to the vertical axis of the battery post. Use of pliers having the described arrangement of the handles is often awkward. Atkinson discloses that the handles should be arranged generally perpendicular to the battery post. Again, this is not necessarily a uniformly desired utilitarian arrangement.

Both Sroka and Atkinson disclose a bifurcated jaw cooperative with a jaw comprised of a single lug or prong. The single lug or prong generally extends beyond the bifurcated jaw. The bifurcated jaw preferably has a uniform thickness and a blunt forward end. Such features, however, may inhibit the utility of the prior art constructions particularly with respect to corroded battery terminals since the pliers may not be easily engaged with the battery cable connector. The development of the present invention seeks to enhance the ease of operation and the manner in which the jaws cooperate with a battery cable connector and battery post.

SUMMARY OF THE INVENTION

Briefly the present invention relates to an improved battery cable puller pliers comprised of a first handle with a pivot section extending from the handle at an angle in the range of about 100° to 150°. The first jaw then extends from the other end of the pivot section. The first jaw includes spaced parallel legs each having a special configuration and each of which is designed to extend fully underneath a battery cable connector. A second handle with an integral pivot section extends along a generally straight line and connects to a second jaw comprising a lug or prong. The lug or prong projects transversely to the line defined by the second handle and the second pivot section. The lug or prong is arranged for cooperative relationship with the legs of the first jaw. The first and second pivot sections are connected by a pivot rod to permit pivotal movement of the handle members and the jaw members.

The first jaw includes a special configuration of parallel legs which are wedge shaped with a leading knife edge and a rib positioned to limit movement of the jaw with respect to the cable connector. The wedge shaped legs extend fully under the connector beyond the center line axis of the post and beyond the lug or prong of the second jaw member. In the preferred embodiment, the handles are coated or have grips and the pivot mechanism is adjustable.

Thus, it is an object of the invention to provide an improved battery cable puller pliers.

It is a further object of the present invention to provide an improved battery cable puller pliers having an improved jaw configuration relative to the jaw configurations associated with similar pliers depicted in the prior art.

Yet another object of the present invention is to provide a battery cable puller pliers which is adjustable.

A further object of the invention is to provide a battery cable puller pliers which has a geometric configuration that enables the pliers to be usefully utilized in a variety of situations.

These and other objects, advantages and features of the invention will be set forth in the detailed description which follows.

BRIEF DESCRIPTION OF THE DRAWING

In the detailed description which follows, reference will be made to the drawing comprised of the following figures.

DESCRIPTION OF THE PREFERRED EMBODIMENT

Figure 1:
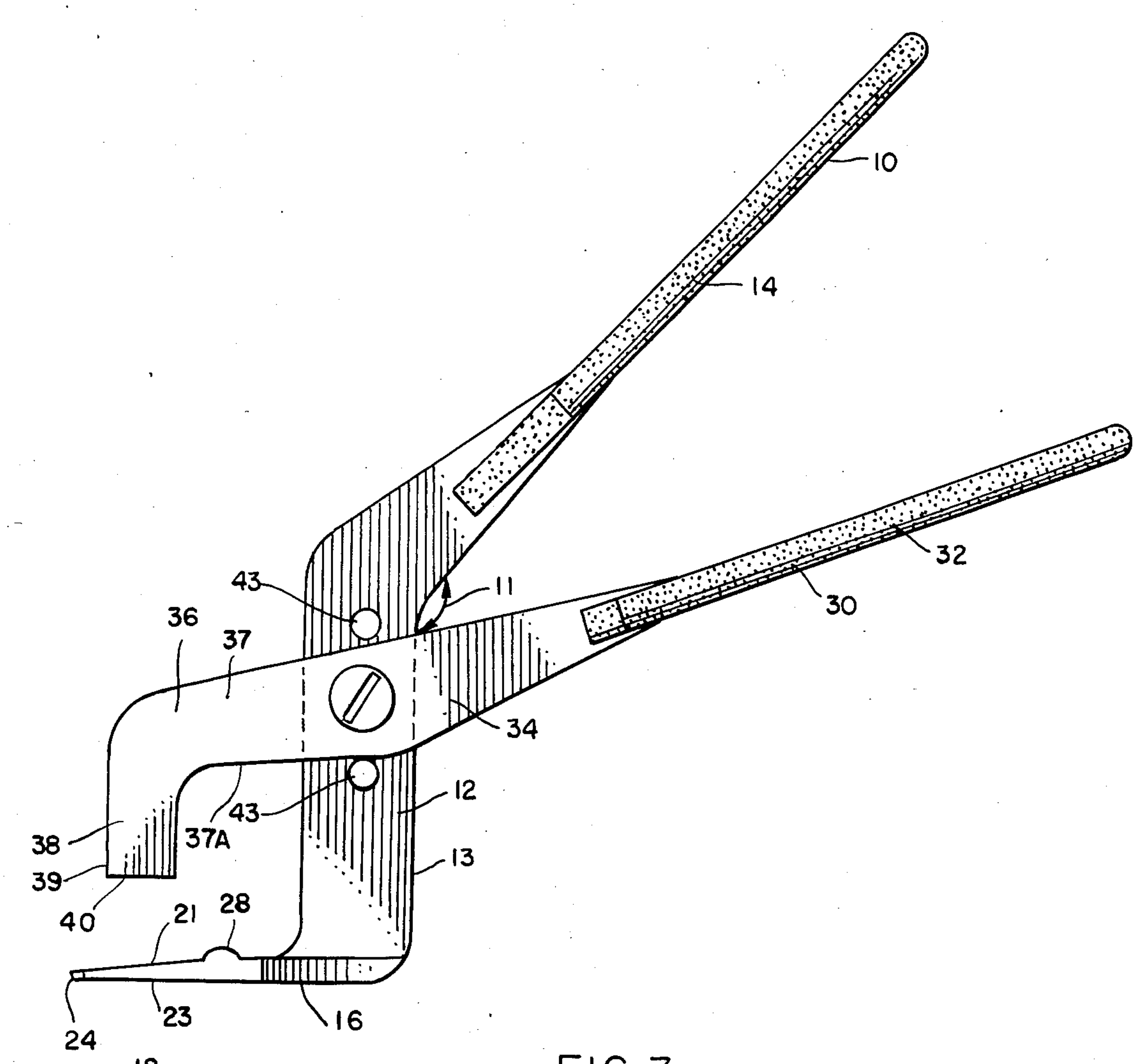
FIG. 1 is a side elevation of the pliers of the invention.

Referring to the figures, the pliers of the present invention includes a first handle 10 which is a generally planar elongate member that is integrally connected with a first pivot section 12. The pivot section 12 forms an angle with respect to the first handle 10, angle 11 in the figures, in the range of about 100° to 150°. The first pivot section 12 is also generally planar and is coplanar with the first handle section 10. The first handle 10 is also coated with a plastic or rubber grip 14.

Figure 3:
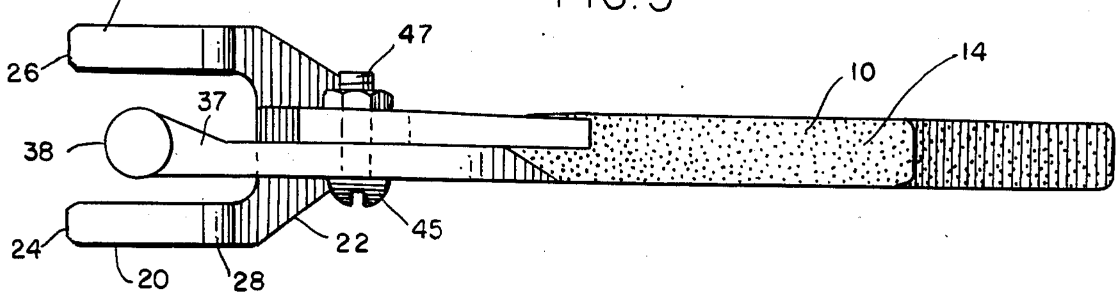
FIG. 3 is a top plan view of the pliers of the invention depicting the configuration of the jaws.

The first pivot section 12 extends in a substantially straight line and connects with a first jaw 16. The first jaw 16, as illustrated in greater detail in FIG. 3, is comprised of a first leg 18 and a spaced parallel second leg 20. The legs 18 and 20 connect with a cross yoke member 22. Each leg 18 and 20 is substantially identically shaped and includes a forward or leading knife edge 24 for leg 20, 26 of leg 18. The legs 18 and 20 are each wedge shaped in profile and increase in thickness toward the junction or connection between the first jaw 16 and the pivot section 12. The legs 18, 20 are thus defined by planar, opposed surfaces 21, 23 with the outer surface 23 thereof being generally perpendicular to the section 12. The legs 18 and 20 each include a rib or step 28. The rib or step 28 cooperates with the side of a battery connector 25, for example, when the legs 18 and 20 are positioned underneath a battery connector 25 to limit the insertion of the first jaw legs 18, 20 under the connector 25. Each leg 18, 20 is equally spaced from a center plane of the pliers defined by section 12. Each leg 18, 20 is of equal length. The section 12 includes a planar side surface 13 transverse to the legs 12 thereby permitting the surface 13 to define an anvil surface for driving the legs 18, 20 with a hammer (not shown) under a connector 25.

The pliers also include a second, elongate handle 30 which is likewise coated or receives a grip 32. The second handle 30 is a generally planar member which connects in a generally straight line with a second pivot section 34. The second pivot section 34 itself, in turn, is connected with a second jaw 36. The jaw 36 includes a first run 37, which is an extension of the section 34, and a second run 38, which is a generally cylindrical member that extends transversely from the first run 37. Run 38 terminates as a lug 39. Thus, the run 38 is transverse to the line defined by the handle 30 and pivot section 34 and, in the embodiment depicted, at a right angle to the bottom surface 37A of first run 37 of the jaw 36. Run 38 is also transverse with respect to the legs 18 and 20 when the handles 30, 10 are in the position depicted in FIG. 2 which is the operative position of the tool. The run 38 terminates in a flat planar surface 40 which is adapted to cooperate and meet against the top of a post 41 of a battery terminal.

A pivot pin or shaft 42 defined by bolt 45 and nut 47 passes through the pivot sections 12 and 34 and holds the separate components of the pliers together. The pin 42 is attached through the pivot sections 12 and 34 and retained by cooperation of bolt 45 and nut 47. The pivot section 12 includes multiple pivot openings 43 which permit adjustment of the handles one with respect to the other again as known to those of ordinary skill in the art. Alternative adjustment constructions are possible.

It is important to note that the run 38 associated with the second jaw 36 moves in response to operation of the handles 10, 30 along an arcuate path which intersects the legs 18 and 20. Further, the surface 40 does not extend beyond the knife edges 24, 26. In fact, the knife edges 24, 26 extend beyond the outer edge or extent of the surface 40. This provides for improved gripping and mechanical advantage of the pliers.

Also, since the knife edge 24, 26 is generally sharp and the legs 18, 20 are wedge shaped, the legs 18, 20 may be inserted more easily beneath the battery post connector 25. The legs 18, 20 act to pry away any corrosion which might exist underneath such a connector. Thus, it is important that the legs 18 and 20 be wedged shaped and that there be a leading knife edge 24, 26. Further, it is important that the legs extend beyond the surface 40 of run 38 associated with the second jaw 36. It is also noted that the legs 18 and 20 are spaced from one another so that the run 38 will pass midway between those legs along the center line of the pliers. The legs 18 and 20 are also spaced so that they will fit on opposite sides of a post 41.

The second handle 30, associated pivot section 34, and associated jaw 36 are all generally coplanar with each other and with the first handle 10 and the first pivot section 12 and perpendicular to the pivot axis of the pliers as defined by pin 42. Again, this facilitates the ease of operation of the pliers.

Because of the angular arrangement of the first handle 10 relative to the pivot section 12 and jaw 16, the pliers of the present invention is useful in most situations encountered in the field. That is, it is possible to position the jaws 16, 36 with respect to a connector 25 and post 41 and thereby effect an appropriate mechanical leverage in order to remove the connector from the post.

Figure 2:
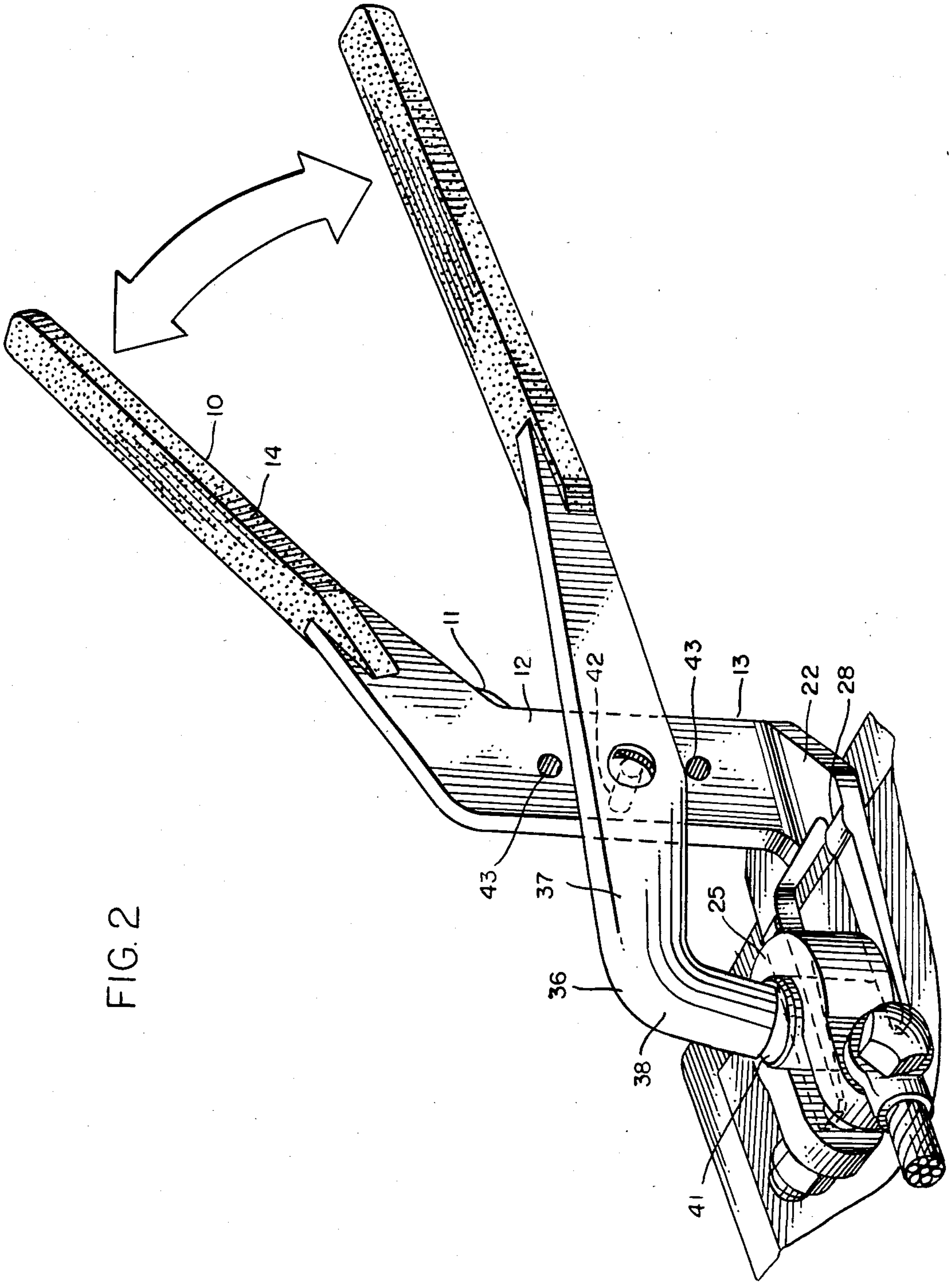
FIG. 2 is a perspective view of the pliers of the invention illustrating a manner of cooperation of the pliers with a battery post and associated connector.

The pliers may be used in the conventional manner as depicted in FIG. 2. However, the legs 18, 20 are easily driven under a connector 25 because of the design which provides the anvil surface 13 and the cooperative configuration of legs 18, 20 having leading knife edges 24, 26. Also, since legs 18, 20 are elongated, they effect removal of all corrosion from beneath the connector 25.

Various changes may be made to the pliers. However, the pliers should be limited only by the following claims and their equivalents.

What is claimed is:

1. An improved battery cable puller pliers comprising, in combination:

- a first generally elongate and straight handle;
- a first generally straight pivot section integral with and extending from the handle at an angle in the range of about 100° to 150°;
- a first jaw integral with and extending from the pivot section, said first jaw extending generally perpendicular to the pivot section whereby the handle, pivot section and jaw define, in profile, a continuous member having a spaced jaw and handle connected by the pivot section;
- a second generally elongate and straight handle;
- a second generally straight pivot section integral with and extending from the second handle in a generally straight line, and pivotally connected to the first pivot section; and
- a second jaw integral with and extending from the second pivot section, said second jaw including an integral run transverse to the second pivot section and transverse to the first jaw, said first jaw comprising first and second spaced, parallel legs joined together at their inner end to define a yoke which connects to the first pivot section, said legs being wedge shaped and terminating with a knife edge, said legs being of equal length and being equally spaced from a center line extending from the yoke so as to be capable of extending on opposite sides of a battery post, said legs parallel to each other, said first handle extending along a line centrally located between the parallel legs said integral run of said second jaw also projecting along a line that extends midway between the legs of the first jaw, said integral run of said second jaw terminating with a surface for contact with the top of a battery post.

2. The pliers of claim 1 wherein the pivot sections are adjustably connected.

3. The pliers of claim 1 wherein the handles, pivot sections and second jaw are generally coplanar in a plane transverse to the pivot axis.

4. The pliers of claim 1 wherein each leg extends inwardly from the knife edge to define a wedge shape with a flat planar surface and also including a rib inwardly from the knife edge defining the limit of the flat planar surface for engaging against a battery connector and thereby controlling the position of the legs relative to the battery post.

5. The pliers of claim 1 including handle grip covers for at least a part of each handle.

6. The pliers of claim 1 wherein the first pivot section includes an anvil surface transverse to the legs and extending from the legs for cooperation with driving means for inserting the legs under a connector.

* * * * *